US011243935B2

(12) United States Patent
Prasad et al.

(10) Patent No.: US 11,243,935 B2
(45) Date of Patent: Feb. 8, 2022

(54) CONTENT MANAGEMENT SYSTEM

(71) Applicant: Oracle International Corporation, Redwood Shores, CA (US)

(72) Inventors: Shyam Babu Prasad, Bangalore (IN); Bhageerath Arasachetty, Mysore (IN); Praveen Kumar Jayaram, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 328 days.

(21) Appl. No.: 16/021,056

(22) Filed: Jun. 28, 2018

(65) Prior Publication Data
US 2020/0004853 A1 Jan. 2, 2020

(51) Int. Cl.
*G06F 16/23* (2019.01)
*G06F 16/93* (2019.01)

(52) U.S. Cl.
CPC ...... *G06F 16/2322* (2019.01); *G06F 16/2379* (2019.01); *G06F 16/93* (2019.01)

(58) Field of Classification Search
None
See application file for complete search history.

(56) References Cited

U.S. PATENT DOCUMENTS

| | | | | |
|---|---|---|---|---|
| 5,953,718 | A * | 9/1999 | Wical | G06F 16/345 707/999.005 |
| 6,289,460 | B1 * | 9/2001 | Hajmiragha | H04L 9/3247 726/28 |
| 6,393,437 | B1 * | 5/2002 | Zinda | G06F 16/2379 |
| 6,564,259 | B1 | 5/2003 | Baber et al. | |
| 7,603,393 | B1 * | 10/2009 | Cote | G06F 16/2322 |
| 2001/0029538 | A1 * | 10/2001 | Blockton | G06F 16/958 707/E17.116 |
| 2004/0225730 | A1 | 11/2004 | Brown et al. | |
| 2005/0240640 | A1 * | 10/2005 | Kaier | G06F 16/93 |
| 2006/0259524 | A1 * | 11/2006 | Horton | G06F 16/00 |

(Continued)

OTHER PUBLICATIONS

DocuWare—Professional Enterprise Content Management, https://pub.docuware.com/en/docuware, downloaded circa Feb. 14, 2018, pp. 1-23.

(Continued)

*Primary Examiner* — Son T Hoang
(74) *Attorney, Agent, or Firm* — IPHorizons PLLC; Narendra Reddy Thappeta

(57) ABSTRACT

A content management system (CMS) receives a create request indicating portions of content items maintained in a repository. CMS generates a new content item incorporating the indicated portions and checks-in the new content item into the repository. In another aspect, a CMS stores a link data indicating that a first portion of the new content item is linked to a second portion of a content item existing in the repository. Upon determining that the second portion has been modified after the checking-in of the new content item, CMS replaces the first portion in the new content item with the modified portion. In one more aspect, CMS receives an update request specifying a modified portion of a content item. CMS generates a revised content item by incorporating the modified portion in the content item and checks-in the revised content item as a revised version of the content item into the repository.

17 Claims, 10 Drawing Sheets

(56) References Cited

U.S. PATENT DOCUMENTS

| | | | |
|---|---|---|---|
| 2009/0241183 A1* | 9/2009 | Boss | G06F 16/2379 |
| 2010/0241951 A1* | 9/2010 | Vandervort | G06F 16/34 |
| | | | 707/E17.044 |
| 2011/0043844 A1* | 2/2011 | Fukuoka | H04N 1/00411 |
| | | | 358/1.13 |
| 2011/0162065 A1* | 6/2011 | Kawara | G06F 16/93 |
| 2013/0185252 A1* | 7/2013 | Palmucci | G06F 40/197 |
| | | | 707/608 |
| 2014/0016162 A1* | 1/2014 | Fukumori | G06F 16/2322 |
| 2015/0248384 A1* | 9/2015 | Luo | G06F 40/197 |
| | | | 715/229 |
| 2015/0278330 A1 | 10/2015 | Hawa et al. | |
| 2015/0339307 A1* | 11/2015 | Hultgren | G06F 16/3323 |
| | | | 707/724 |
| 2016/0048486 A1 | 2/2016 | Lopategui | |
| 2016/0085919 A1* | 3/2016 | Sohr | G06F 16/93 |
| 2016/0275059 A1* | 9/2016 | Taparia | G06F 16/93 |
| 2017/0131944 A1 | 5/2017 | Bruckner et al. | |
| 2017/0272444 A1 | 9/2017 | Kopf et al. | |
| 2017/0277905 A1 | 9/2017 | Bjorg et al. | |
| 2019/0196784 A1* | 6/2019 | Sheffer | G06F 16/219 |

OTHER PUBLICATIONS

Integrating IBM BPM and Enterprise Content Management, https://www.ibm.com/developerworks/bpm/bpmjournal/1312_mcelroy/1312_mcelroy.html, downloaded circa Feb. 15, 2018, pp. 1-13.
Updating IBM BPM documents, https://www.ibm.com/support/knowledgecenter/en/SSFTN5_8.5.0/com.ibm.wbpm.wle.editor.doc/modeling/topic/tbpmupdatedoc.html, downloaded circa Feb. 15, 2018, pp. 1-2.

* cited by examiner

| Doc ID | Doc Name | Pages | Version | Status | Check In Date Time | Check In By | Check out Date Time | Check out By |
|---|---|---|---|---|---|---|---|---|
| D101 | Document1 | Page1 | 1.0 | IN | 4/6/2018 11:18 AM | User 1 | 4/8/2018 12:25 PM | User 1 |
| D102 | Document2 | Page1...Page3 | 1.2 | IN | 4/16/2018 9:20 AM | User 2 | 4/19/2018 11:00 AM | User 2 |
| D103 | Document3 | Page1...Page10 | 1.5 | IN | 4/19/2018 11:00 AM | User 3 | 4/24/2018 3:00 PM | User 3 |
| D104 | Document4 | Page1...Page8 | 1.3 | IN | 4/25/2018 10:00 AM | User 4 | 4/28/2018 2:00 PM | User 4 |
| D105 | Document5 | Page1...Page5 | 2.0 | IN | 4/29/2018 12:15 PM | User 5 | 5/3/2018 2:30 PM | User 5 |
| D106 | Document6 | Page1...Page9 | 2.6 | OUT | 5/5/2018 10:45 AM | User 6 | 5/7/2018 1:26 PM | User 3 |
| D107 | Document7 | Page1...Page6 | 3.0 | OUT | 5/10/2018 9:15 AM | User 7 | 5/13/2018 11:45 AM | User 1 |

*FIG. 4A*

| Doc ID | Doc Name | Pages | Version | Status | Check In Date Time | Check In By | Check out Date Time | Check out By |
|---|---|---|---|---|---|---|---|---|
| D101 | Document1 | Page1 | 1.0 | IN | 4/6/2018 11:18 AM | User 1 | 4/8/2018 12:25 PM | User 1 |
| D102 | Document2 | Page1...Page3 | 1.2 | IN | 4/16/2018 9:20 AM | User 2 | 4/19/2018 11:00 AM | User 2 |
| D103 | Document3 | Page1...Page10 | 1.5 | IN | 4/19/2018 11:00 AM | User 3 | 4/24/2018 3:00 PM | User 3 |
| D104 | Document4 | Page1...Page8 | 1.3 | IN | 4/25/2018 10:00 AM | User 4 | 4/28/2018 2:00 PM | User 4 |
| D105 | Document5 | Page1...Page5 | 2.0 | IN | 4/29/2018 12:15 PM | User 5 | 5/3/2018 2:30 PM | User 5 |
| D106 | Document6 | Page1...Page9 | 2.6 | OUT | 5/5/2018 10:45 AM | User 6 | 5/7/2018 1:26 PM | User 3 |
| D107 | Document7 | Page1...Page6 | 3.0 | OUT | 5/10/2018 9:15 AM | User 7 | 5/13/2018 11:45 AM | User 1 |
| D110 | Document200 | Page1...Page7 | 1.0 | IN | 5/15/2018 10:00 AM | User 99 | X | X |

*FIG. 4B*

| Link ID | Source Doc ID | Source Page | Target Doc ID | Target Page |
|---|---|---|---|---|
| L201 | D101 | 1 | D110 | 1 |
| L202 | D102 | 3 | D110 | 2 |
| L203 | D105 | 1 | D110 | 3 |
| L204 | D105 | 5 | D110 | 4 |
| L205 | D107 | 1 | D110 | 5 |
| L206 | D107 | 2 | D110 | 6 |
| L207 | D107 | 6 | | 7 |

*FIG. 4C*

| Doc ID | Doc Name | Pages | Version | Status | Check In Date Time | Check In By | Check out Date Time | Check out By |
|---|---|---|---|---|---|---|---|---|
| D101 | Document1 | Page1 | 1.0 | IN | 4/6/2018 11:18 AM | User 1 | 4/8/2018 12:25 PM | User 1 |
| D102 | Document2 | Page1...Page3 | 1.2 | IN | 4/16/2018 9:20 AM | User 2 | 4/19/2018 11:00 AM | User 2 |
| D103 | Document3 | Page1...Page10 | 1.5 | IN | 4/19/2018 11:00 AM | User 3 | 4/24/2018 3:00 PM | User 3 |
| D104 | Document4 | Page1...Page8 | 1.3 | IN | 4/25/2018 10:00 AM | User 4 | 4/28/2018 2:00 PM | User 4 |
| D105 | Document5 | Page1...Page5 | 2.2 | IN | 5/9/2018 2:15 AM | User 99 | 5/3/2018 2:30 PM | User 5 |
| D106 | Document6 | Page1...Page9 | 2.6 | OUT | 5/5/2018 10:45 AM | User 6 | 5/7/2018 1:26 PM | User 3 |
| D107 | Document7 | Page1...Page6 | 3.0 | OUT | 5/10/2018 9:15 AM | User 7 | 5/13/2018 11:45 AM | User 1 |

FIG. 7

CONTENT MANAGEMENT SYSTEM

BACKGROUND OF THE DISCLOSURE

Technical Field

The present disclosure relates to content management systems.

Related Art

Content management systems (CMSs) are often used to manage content items in digital form stored in repositories. The content items can be documents, manuals, journals, invoice, insurance claims, e-mails retained for regulatory reasons, government deals, image files, etc., as is well known in the relevant arts.

The management of content items is typically based on check-in and check-out of content items. Check-in of a content item implies that the content item is to be stored in the repository and is thereafter available to other users. The users may be able to check-in the content item as either a new item or an updated version of an item already existing in the repository.

While many users can access checked-in content items concurrently, an individual user can check-out a desired content item to obtain exclusive update privileges for that checked out content item. Such exclusive update privileges implies that other users are blocked from checking-in updated versions of that checked-out content item typically until the user checks-in the content item or an updated version thereof.

Aspects of the present disclosure are directed to content management systems.

BRIEF DESCRIPTION OF THE DRAWINGS

Example embodiments of the present disclosure will be described with reference to the accompanying drawings briefly described below.

FIGS. 4A-4C depicts portions of management data maintained by a content management system in one embodiment.

FIG. 7 depicts a portion of management data maintained by a content management system in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1:
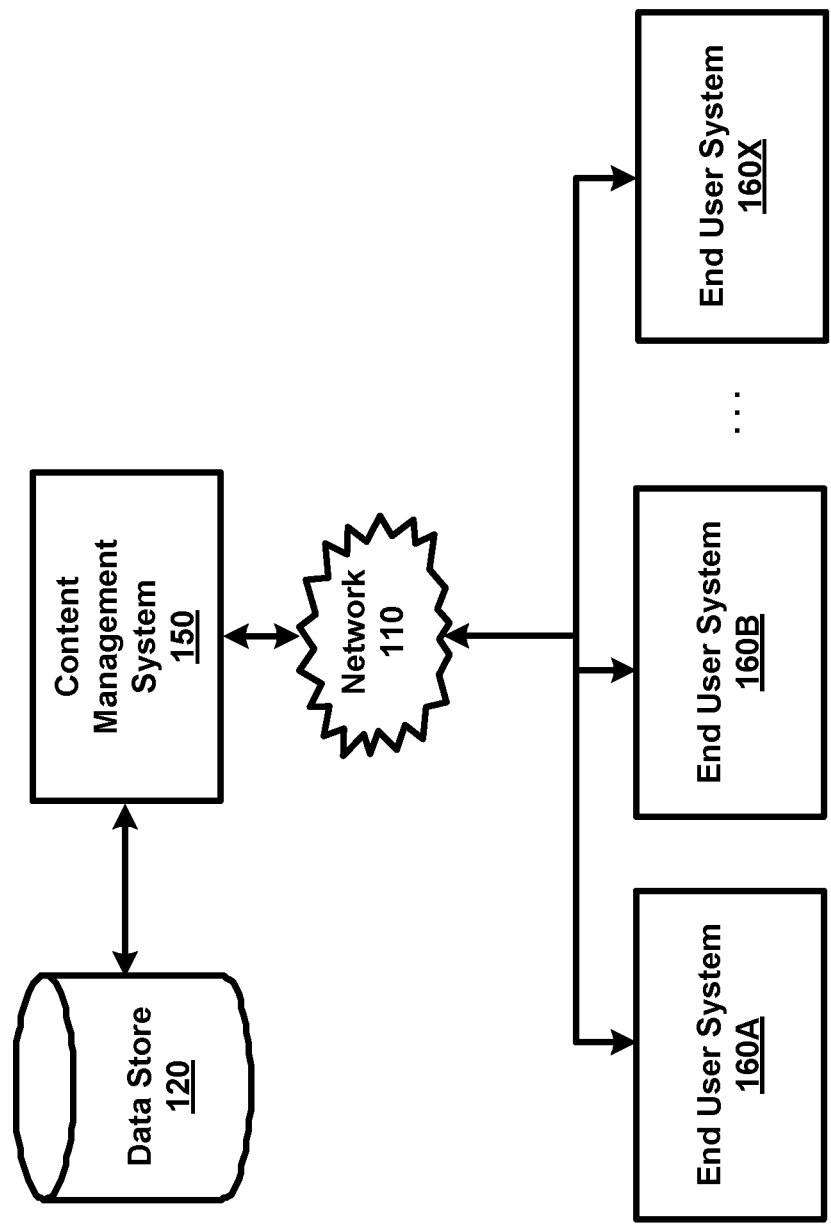
FIG. 1 is a block diagram illustrating an example environment in which several aspects of the present disclosure can be implemented.

According to an aspect of the present disclosure, a content management system maintaining content items in a repository, receives a create request indicating portions of one or more of the (maintained) content items. The content management system generates a new content item incorporating the portions indicated in the create request and checks-in the new content item into the content items maintained in the repository.

In one embodiment, the create request is received from an end user system, wherein the portions are not downloaded to the end user system before the create request is received. The content management system sends the new content item to the end user system as a response to the create request.

According to another aspect of the present disclosure, a content management system stores a link data indicating that a first portion incorporated into a new content item is linked to a second portion of a content item existing in the repository. Upon determining that the second portion has been modified to form a third portion after the checking-in of the new content item, the content management system identifies, based on the link data and in response to the determining, that the first portion is linked to the second portion. The content management system accordingly replaces the (previously incorporated) first portion in the new content item with the third portion.

In one embodiment, the content management system receives a link indication associated with the create request (noted above), with the link indication indicating whether or not the first portion is to be linked to the second portion. The content management system performs the above noted storing, determining, identifying and replacing only if the link indication indicates that the first portion is to be linked. If the link indication indicates that the first portion is not to be linked, the first portion is left unchanged even if the second portion is modified after the checking-in of the new content item.

According to one more aspect of the present disclosure, a content management system maintaining content items in a repository, receives an update request specifying a modified portion of a content item maintained in a repository, with the modified portion corresponding to a previous portion of the content item. The content management system generates a revised content item by incorporating the modified portion in place of the previous portion in the content item and checks-in the revised content item as a revised version of the content item into the content items maintained in the repository.

In one embodiment, the update request is received from a user using an end user system, wherein the content item is not checked-out by the user before the update request is received. The content management system sends the revised content item as a response to said update request.

According to yet another aspect of the present disclosure, each content item noted above is a respective document, wherein each portion of the content item is a corresponding page of the respective document.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example environment (computing system) in which several aspects of the present disclosure can be implemented. The block diagram is shown containing network 110, data store 120, content management system (CMS) 150 and end user systems 160A-160X.

Merely for illustration, only representative number/type of blocks is shown in the FIG. 1. Many environments often contain many more blocks, both in number and type, depending on the purpose for which the environment is designed. Each block of FIG. 1 is described below in further detail.

Network 110 represents a network providing connectivity between CMS 150 and end user systems 160A-160X 11. Network 110 may be an internet (including the world-wide connected Internet), a combination of internet and intranet, etc. Network 110 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by network 110. When the packet contains content such as port numbers, which specifies a target application, the packet may be said to be directed to such application as well.

Data store 120 represents a non-volatile (persistent) storage facilitating storage and retrieval of data (content items, portions thereof, etc.) by applications executing in CMS 150. Data store 120 may be implemented as a corresponding database server using relational database technologies and accordingly provide storage and retrieval of data using structured queries such as SQL (Structured Query Language). Alternatively, data store 120 may be implemented as a corresponding file server providing storage and retrieval of data in the form of files organized as one or more directories, as is well known in the relevant arts.

Each of end user systems 160A-160X represents a system such as a personal computer, workstation, mobile device, computing tablet etc., used by end users to generate (user) requests directed to applications executing in CMS 150. The user requests may be generated using appropriate user interfaces (e.g., web pages provided by an application executing in the server, a native user interface provided by a portion of an application downloaded from the server, etc.). In general, an end user system requests an application for performing desired tasks and receives the corresponding responses (e.g., web pages) containing the results of performance of the requested tasks. The web pages/responses may then be presented to the user at end user system 160 by client applications such as the browser.

CMS 150 represents a server system, such as a web/application server, executing applications designed to perform tasks requested by users using end user systems 160A-160X. CMS 150 may use data stored internally (for example, in a non-volatile storage/hard disk within the server system), external data (e.g., maintained in data store 120) and/or data received from external sources (e.g., from the user) in performing the requested tasks. CMS 150 then sends the result of performance of the tasks to the requesting end user system (one of 160A-160X). The results may be accompanied by specific user interfaces (e.g., web pages) for displaying the results to the requesting user.

CMS 150 operates to provide a management system for content items stored in data store 120 (repository). The associated management data (described in detail in below sections) may also be stored in data store 120. CMS 150 facilitates users to perform various tasks associated with management of content such as check-in of a content item, check-out of a content item, downloading of a content item, etc. In one embodiment, the content items are documents with the portions of such content items being corresponding pages of the documents. It should be appreciated that the term "pages" used herein refers to pre-defined/fixed parts of a document adapted for printing on a paper copy or display on a display unit, as will be apparent to a skilled practitioner.

CMS 150, provided according to several aspects of the present disclosure, facilitates the creation of a new content item based on content items already stored/checked-in to the repository, as described below with examples.

3. Creating a New Content Item

Figure 2:
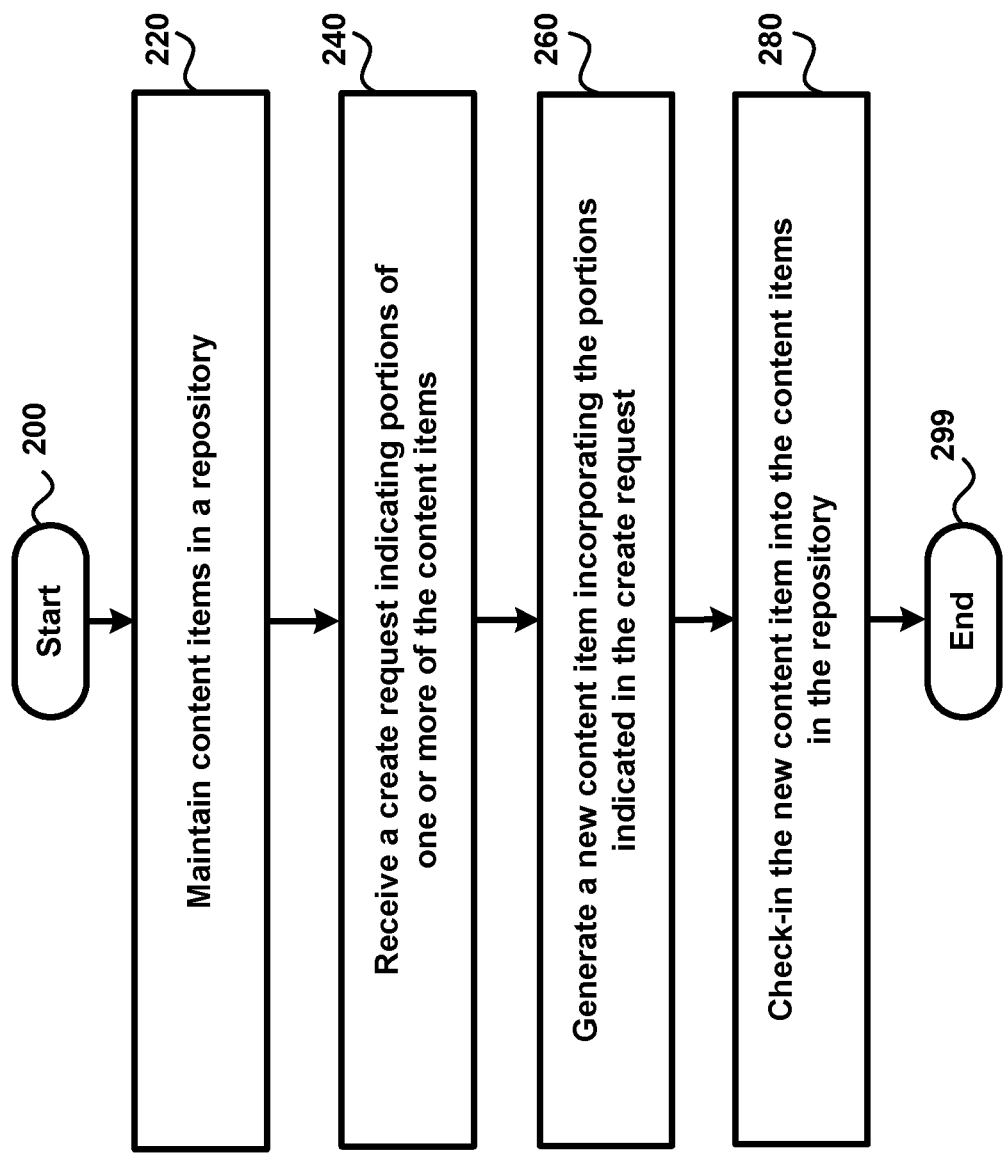
FIG. 2 is a flow chart illustrating the manner in which a new content item based on content items stored in a repository is created according to an aspect of the present disclosure.

FIG. 2 is a flow chart illustrating the manner in which a new content item based on content items stored in a repository is created according to an aspect of the present disclosure. The flowchart is described with respect to CMS 150 of FIG. 1 merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 220.

In step 220, CMS 150 maintains content items in a repository (such as data store 120 as noted above). In the scenario that the content items are documents, data store 120 is implemented as a file server with each document being stored as a corresponding file in the file server.

In step 240, CMS 150 receives a create request indicating portions of one or more of the content items maintained in the repository. The cerate request may be received from a user using one (assumed to be 160A) of end user systems 160A-160Z. The create request may indicate the content items and the portions thereof according to a pre-defined convention such as unique identifiers (document name, page number, etc.) associated with the corresponding content item and portion.

In step 260, CMS 150 generates a new content item incorporating the portions indicated in the create request. The generation may be performed consistent with the nature/ type of the content item maintained by the content management system. For example, in the scenario that the content items are documents and portions are pages, CMS 150 may generate a new document by incorporating the pages of existing documents (indicated in the create request) as corresponding pages of the new document.

In step 280, CMS 150 checks-in the newly generated content item into the content items in the repository. As noted above, check-in involves storing the new content item in the repository (data store 120) and updating the management data associated with the new content item such that the new content item is thereafter made available to other users. The flowchart ends in step 299.

Thus, the content management system (CMS 150) facilitates the creation of a new content item based on content items already maintained in a repository. Such creation is facilitated without requiring a user using end user system 160A to download the content items or the corresponding portions (indicated in the create request) to the end user system. In one embodiment, CMS 150 after checking-in at step 280, sends the new content item as a response to the create request. The response may be provided to the end user system (160A) from which the create request was received. The new content item may then be displayed on a display unit associated with end user system 160A.

The manner in which CMS 150 facilitates the creation of a new content item according to FIG. 2 is illustrated below with examples.

4. Illustrative Example for Creation of a New Content Item

FIGS. 3 and 4A-4C together illustrate the manner in which a user creates a new content item in one embodiment. In the following description, the content items are assumed to be documents with the portions of such content items being corresponding pages of the documents. Each of the Figures is described in detail below.

Figure 3:
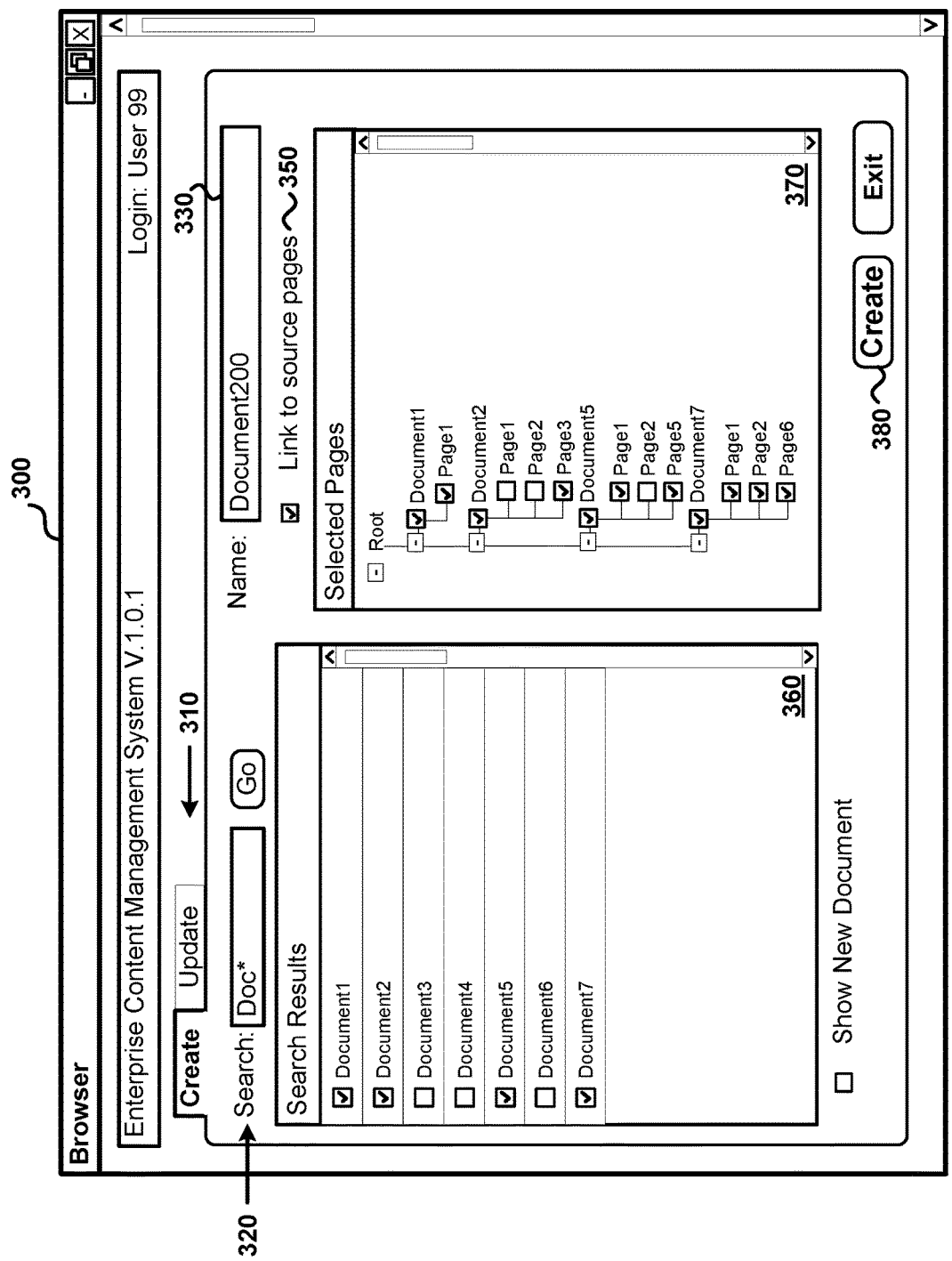
FIG. 3 depicts a sample user interface provided for creation of a new content item/document in one embodiment.

FIG. 3 depicts a sample user interface provided for creation of a new content item/document in one embodiment. Display area 300 (and also display area 600 in FIG. 6) represents a portion of a user interface displayed on a display unit (not shown) associated with one of end user systems 160A-160X. In one embodiment, display area 300/600 corresponds to a web page rendered by a browser executing on the end user system. Web pages are provided by CMS 150 in response to a user sending appropriate requests (for example, by specifying corresponding URLs in the address bar) using the browser.

Display area 300 depicts a content management web page that is displayed in the browser (executing in end user system 160A, for illustration) in response to a user specifying a URL in the browser address bar. Display area 310 indicates the various tabs that may be selected by the user, with "Create" tab shown selected by the user.

Display area 320 facilitates the user to search for documents by specifying a search string (e.g. "Doc*" shown there), with display area 360 listing the documents whose names ("Document1", "Document2", etc.) match the user specified search string. Display area 360 displays a list of source documents from which the user may select the document from which pages are to be incorporated into the new document. Display area 360 indicates that the user has selected the source documents "Document1", "Document2", "Dcoument5", and "Document7".

Display area 330 facilitates the user to specify the name of the new document, option 350 facilitates the user to indicate whether (option 350 selected) or not (option 350 not selected) the pages in the new document are to be linked to the pages from the source documents, while display area 370 facilitates the user to select desired portions/pages from the source documents (by checking the check boxes shown alongside each document/portion). Display area 370 indicates that the user has selected "Page1" from "Document1", "Page3" from "Document2", etc. The user may also select option "Show New Document" to indicate whether the newly created document is to be displayed after checking-in to the content management system.

After specifying the desired details, the user may click/select display area 380 ("Create" button) to send a create request from end user system 160A to CMS 150. The create request indicates the name of the new document specified in display area 330, the selection of options (such as 350), and the documents and pages selected by the user in display area 370. CMS 150 then creates a new document in response to the create request as described in detail below.

FIGS. 4A-4C depicts portions of management data maintained by a content management system in one embodiment. For illustration, the management data is assumed to be maintained in the form of tables in data store 120. However, in alternative embodiments, the management data may be maintained according to other data formats (such as files according to extensible markup language (XML), etc.) and/or using other data structures (such as lists, trees, etc.), as will be apparent to one skilled in the relevant arts by reading the disclosure herein.

Referring to FIG. 4A, table 400 depicts a portion of management data indicating the details of the documents maintained in the content management system. Column 421 ("Doc ID") specifies a unique identifier for each document stored in the corresponding row, column 422 ("Doc Name") specifies a corresponding document name, column 423 ("Pages") specifies a set of pages in the document, column 424 ("Version") specifies a version of the document, column 425 ("Status") specifies whether the document is checked-in ("IN") or checked-out ("OUT"). Columns 426 ("Check In Date Time") and 427 ("Check In By") respectively specify the date and time and the corresponding user who checked-in the document into the content management system. Columns 428 ("Check Out Date Time") and 429 ("Check Out By") respectively specify the date and time and the corresponding user who checked-out the document from the content management system.

Thus, row 431 specifies the details of a document having the identifier "D105" (column 421), named "Document5" (column 422), containing the pages "Page1 . . . Page5" (column 423), version "2.0" (column 424), status "IN" (column 425), with corresponding checked-in and checked-out date-times and user details (columns 426-429). Row 432 specifies the details of document that has been checked-out of the content management system. Similarly, the other rows of table 400 specify the details of other documents maintained by CMS 150.

In response to receiving the create request from the user interface of FIG. 3, CMS 150 generates a new document by incorporating the pages specified in the create request (selected by the user in display area 370 of FIG. 3). CMS 150 then stores the new document in data store 120 and then updates the management data of table 400. The updated management data is described in detail below.

Referring to FIG. 4B, table 440 is similar to table 400 and accordingly the description of the rows and columns is not repeated here for conciseness. Specifically, table 440 is shown containing the new row 450 that specifies the details of the new document created by CMS 150 in response to the create request received from the user using the user interface of FIG. 3. Row 450 indicates the name of the document as "Document200" (as specified in display area 330) and the pages "Page1 . . . Page7" corresponding to the 7 pages selected by the user in display area 370 of FIG. 3.

Thus, CMS 150 facilitates a user to create a new content item (document) from the portions (pages) contained in other content items (documents) checked-in to the content management system. CMS 150 may then provide the new content item as a response to the create request. In one embodiment, if the user had selected the option "Show New Document" in FIG. 3, CMS 150 sends the new content item/document to the requesting end user system 160A thereby enabling the new document to be displayed (for example, using the browser) at the end user system.

5. Linking of Portions of Content Items

According to an aspect of the present disclosure, CMS 150 maintains a link data (a part of management data) indicating (target) portions of a new content item that are linked to the corresponding (source) portions of content items stored in data store 120. Accordingly, upon determining that a source portion of a source document/content item has been updated to a modified portion, CMS 150 identifies, based on the link data, corresponding target portion(s) linked to the source portion. CMS 150 thereafter replaces the target portion/page in the new content item/document with the modified portion/page.

In one embodiment, CMS 150 receives a link indication (option 350) associated with the create request, with the link indication indicating whether (option 350 selected) or not (option 350 not selected) the target portions are to be linked to the source portions. CMS 150 performs the above noted storing of link data, determining, identifying and replacing only if the link indication indicates that the target portions are to be linked (option 350 selected). If the link indication indicates that the target portions are not to be linked (option 350 not selected), the target portions are left unchanged even if the source portions are modified after the checking-in of the new content item/document ("Document200"). The manner in which CMS 150 may maintain the link data is described in detail below.

Referring to FIG. 4C, table 470 depicts a portion of link data (management data) indicating the details of the links between pages of documents maintained in the content management system. Column 481 ("Link ID") specifies a unique identifier for each link stored in the corresponding row, columns 482 ("Source Doc ID") and 483 ("Source Page") respectively specify the document identifier and page number of the source portion of the link, while columns 484 ("Target Doc ID") and 485 ("Target Page") respectively specify the document identifier and page number of the target portion of the link.

Thus, row 490 indicates that a link having the link identifier "L206" (column 481) exists between Page 2 of Document7 (corresponding to identifier "D107" in table 440) and Page 6 of Document200 (corresponding to identifier "D110" in table 440). Similarly, the other rows of table 470 specify the details of other links between documents maintained by/in the content management system (CMS 150).

CMS 150 processes modifications to portions/pages based on link data of table 470. For example, in response to CMS 150 determining that page 2 of Document7 has been modified to a new page, CMS 150 identifies, by inspecting/ examining table 470, that Page 6 of Document200 is linked to page 2 of Document7 (row 490) and accordingly CMS 150 replaces page 6 with the new page in Document200. Similarly, CMS 150 may replace other target portions (as indicated by columns 484 and 485) with the modified source portions (as indicated by columns 482 and 483) as specified by link data 470.

It may be appreciated that the (seven) rows of table 470 corresponds to linking of the source and target portions/pages of documents specified in the create request received from the user interface of FIG. 3. The seven rows have been added to table 470 in response to the link indication indicating that the target portions are to be linked (option 350 selected). In the alternative scenario that the link indication indicates that the target portions are not to be linked (option 350 not selected), the seven rows shown in table 470 are not added by CMS 150 and accordingly, the target portions (e.g. Page 6 of Document200) are left unchanged even if the source portions (e.g. page 2 of Document7) are modified after the checking-in of the new content item/document ("Document200").

CMS 150, provided according to several aspects of the present disclosure, also facilitates the update of a content item stored in the repository, as described below with examples.

6. Updating an Existing Content Item

Figure 5:
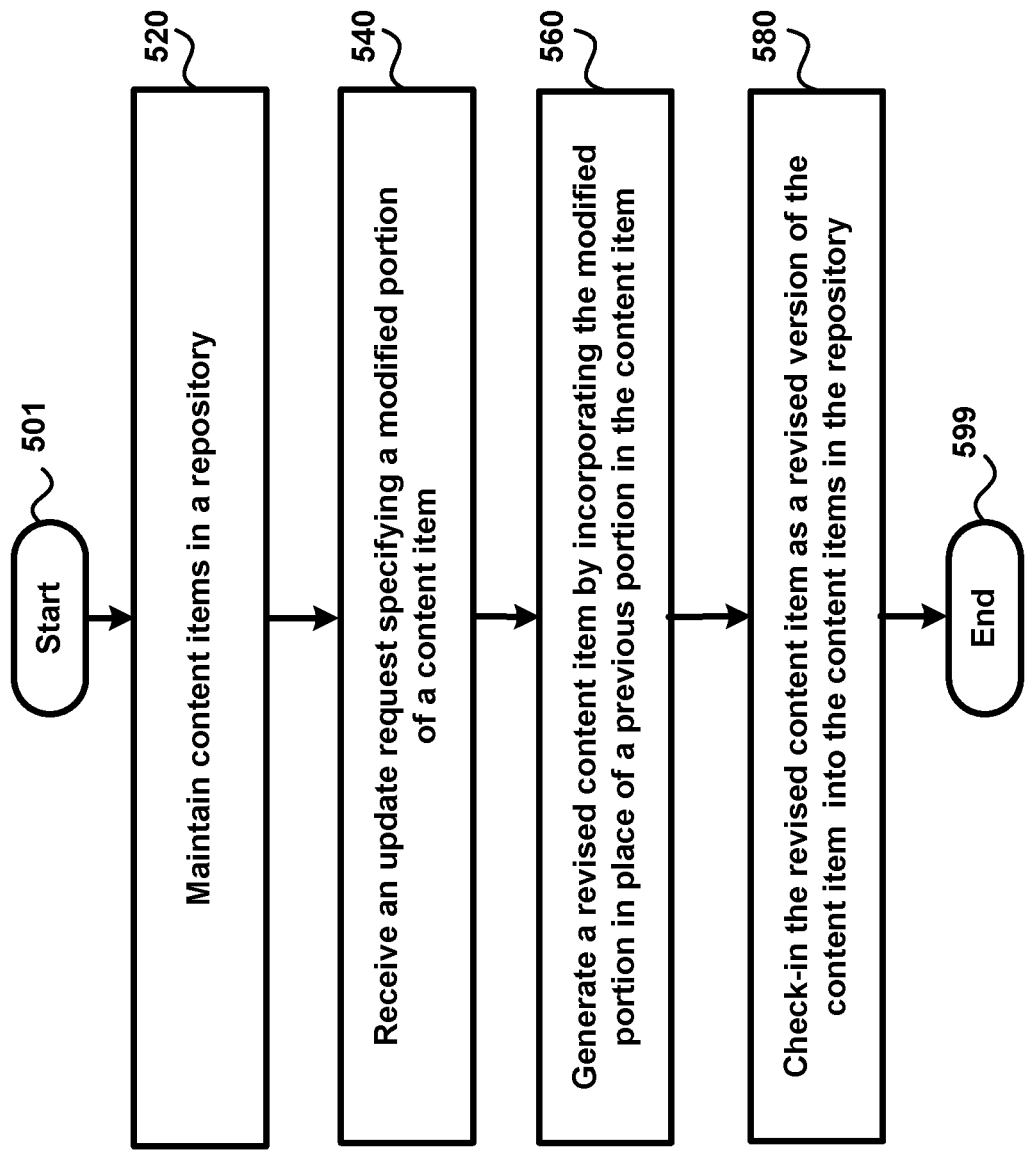
FIG. 5 is a flow chart illustrating the manner in which a content item in a repository is updated according to an aspect of the present disclosure.

FIG. 5 is a flow chart illustrating the manner in which a content item in a repository is updated according to an aspect of the present disclosure. The flowchart is described with respect to CMS 150 of FIG. 1 merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 501, in which control immediately passes to step 520.

In step 520, CMS 150 maintains content items in a repository (such as data store 120 as noted above). In the scenario that the content items are documents, data store 120 is implemented as a file server with each document being stored as a corresponding file in the file server.

In step 540, CMS 150 receives an update request specifying a modified portion of a (specific) content item maintained in the repository. The update request may be received from a user using one (assumed to be 160A) of end user systems 160A-160Z. The update request may indicate the specific content item, the modified portion (for example, using unique identifiers such as document name, page number, etc.) and the specific modifications made to the modified portion.

In step 560, CMS 150 generates a revised content item by incorporating the modified portion in place of a previous portion in the specific content item. The generation may be performed consistent with the nature/type of the content item maintained by the content management system. For example, in the scenario that the content items are documents and portions are pages, CMS 150 may generate a revised document by replacing the previous page of the specific document with the modified page.

In step 580, CMS 150 checks-in the revised content item as a revised version of the (specific) content item into the content items in the repository. As noted above, check-in involves storing the new content item in the repository (data store 120) and updating the management data associated with the new content item such that the new content item is thereafter made available to other users. The flowchart ends in step 599.

Thus, the content management system (CMS 150) facilitates the update of an existing content item maintained in a repository. Such update is facilitated without requiring a user using end user system 160A to check-out the (specific) content item (indicated in the update request). In one embodiment, CMS 150 after checking-in at step 580, sends the revised content item as a response to the update request. The response may be provided to the end user system (160A) from which the update request was received. The new content item may then be displayed on a display unit associated with end user system 160A.

The manner in which CMS 150 facilitates the update of an existing content item according to FIG. 5 is illustrated below with examples.

7. Illustrative Example for Update of an Existing Content Item

Figure 6:
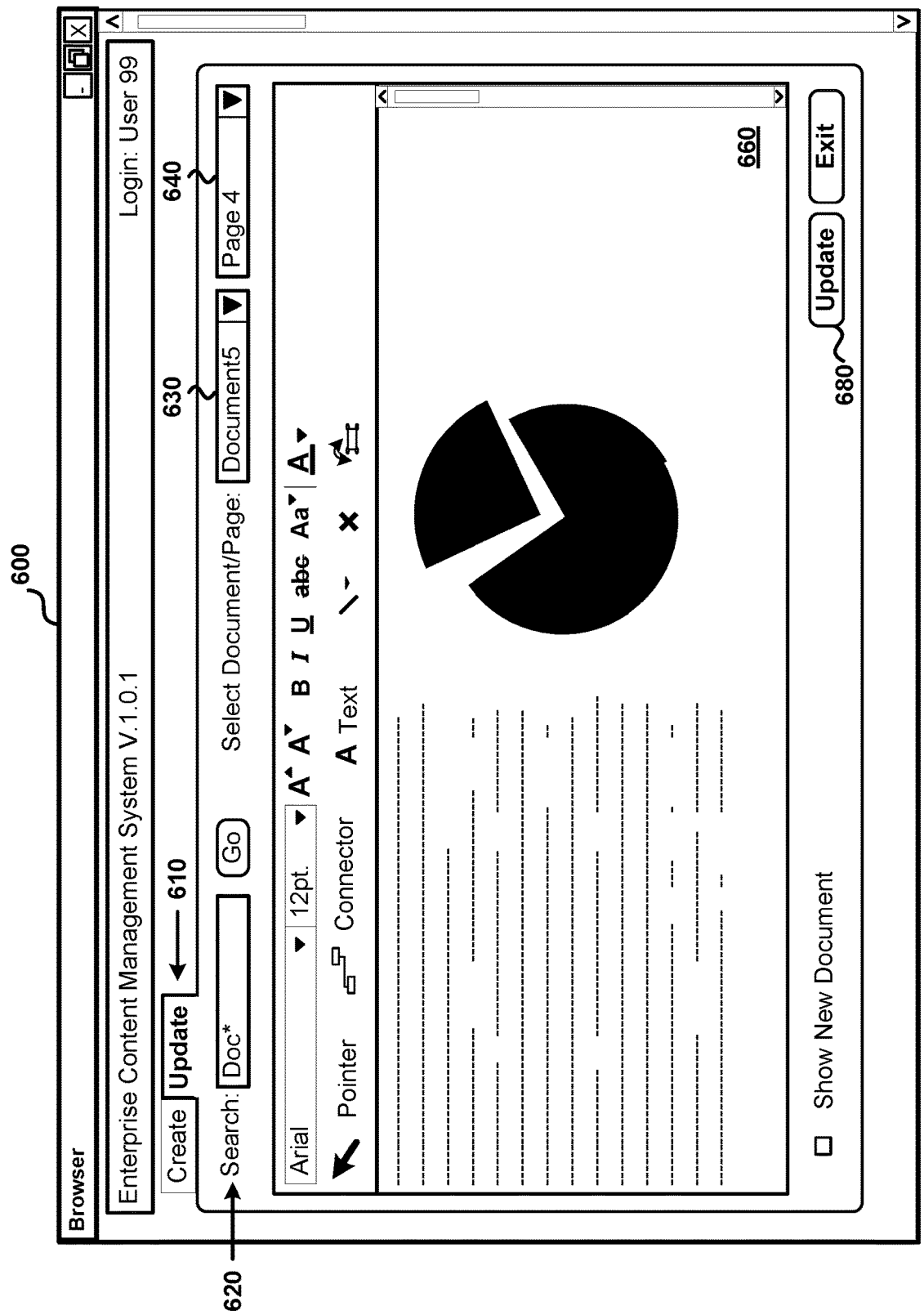
FIG. 6 depicts a sample user interface provided for update of an existing content item/document in one embodiment.

FIGS. 6 and 7 together illustrate the manner in which a user updates an existing content item in one embodiment. In the following description, the content items are assumed to be documents with the portions of such content items being corresponding pages of the documents. Each of the Figures is described in detail below.

FIG. 6 depicts a sample user interface provided for update of an existing content item/document in one embodiment. Display area 600, similar to display area 300, depicts a content management web page that is displayed in the browser (executing in end user system 160A, for illustration) in response to a user specifying a URL in the browser address bar. Display area 610, similar to display area 310, indicates the various tabs that may be selected by the user, with "Modify" tab shown selected by the user.

Display area 620 facilitates the user to search for documents by specifying a search string (e.g. "Doc*" shown there), with display area 630 listing the documents whose names ("Document1", "Document2", etc. not shown) match the user specified search string. In response to the user selecting one of the documents from the list provided in display area 630, the corresponding pages in the selected document is shown as a list in display area 640. The user may thereafter select the desired page to be updated from the list in display area 640. Display areas 630 and 640 together indicate that the user has selected "Page 4" of "Document5".

Display area 660 facilitates the user to edit the content of the selected page using convenient input devices such as a keyboard and a mouse. For example, the user may add text using the keyboard or format the text by selecting the icons shown there using a mouse. The user may also select option "Show New Document" to indicate whether the revised document is to be displayed after checking-in to the content management system.

After modifying the selected page, the user may click/select display area 680 to send a update request from end user system 160A to CMS 150. The update request specifies the modified portion/page of display area 660 along with the details of the existing content item to be updated (such as the identifiers of the portion "Page 4" and content item "Document5" as selected by the user in display areas 630 and 640). CMS 150 then updates the existing document in response to the update request as described in detail below.

FIG. 7 depicts a portion of management data maintained by a content management system in one embodiment. Table 700 is similar to table 400 and accordingly the description of the rows and columns is not repeated here for conciseness. Specifically table 700 is shown containing row 710 updated by CMS 150 in response to the update request received from the user using the user interface of FIG. 6. Row 710 indicates that the document "Document5" (as specified in display area 630) has been revised to version "2.2" (instead of "2.0" in row 431).

Thus, CMS 150 facilitates a user to update an existing content item (document). CMS 150 may then provide the revised content item as a response to the update request. In one embodiment, if the user has selected the option "Show New Document" in FIG. 3, CMS 150 sends the revised content item/document to the requesting end user system 160A thereby enabling the new document to be displayed (for example, using the browser) at the end user system.

It should be appreciated that though in the disclosure herein, the repository (data store 120) storing the content items (and the management data) is shown separate/distinct from CMS 150, in alternative embodiments, the repository and content management system may be implemented together in a single system or distributed across multiple systems. Many of such implementations are contemplated to be covered by several aspects of the present disclosure.

It should be further appreciated that the features described above can be implemented in various embodiments as a desired combination of one or more of hardware, software, and firmware. The description is continued with respect to an embodiment in which various features are operative when the software instructions described above are executed.

8. Digital Processing System

Figure 8:
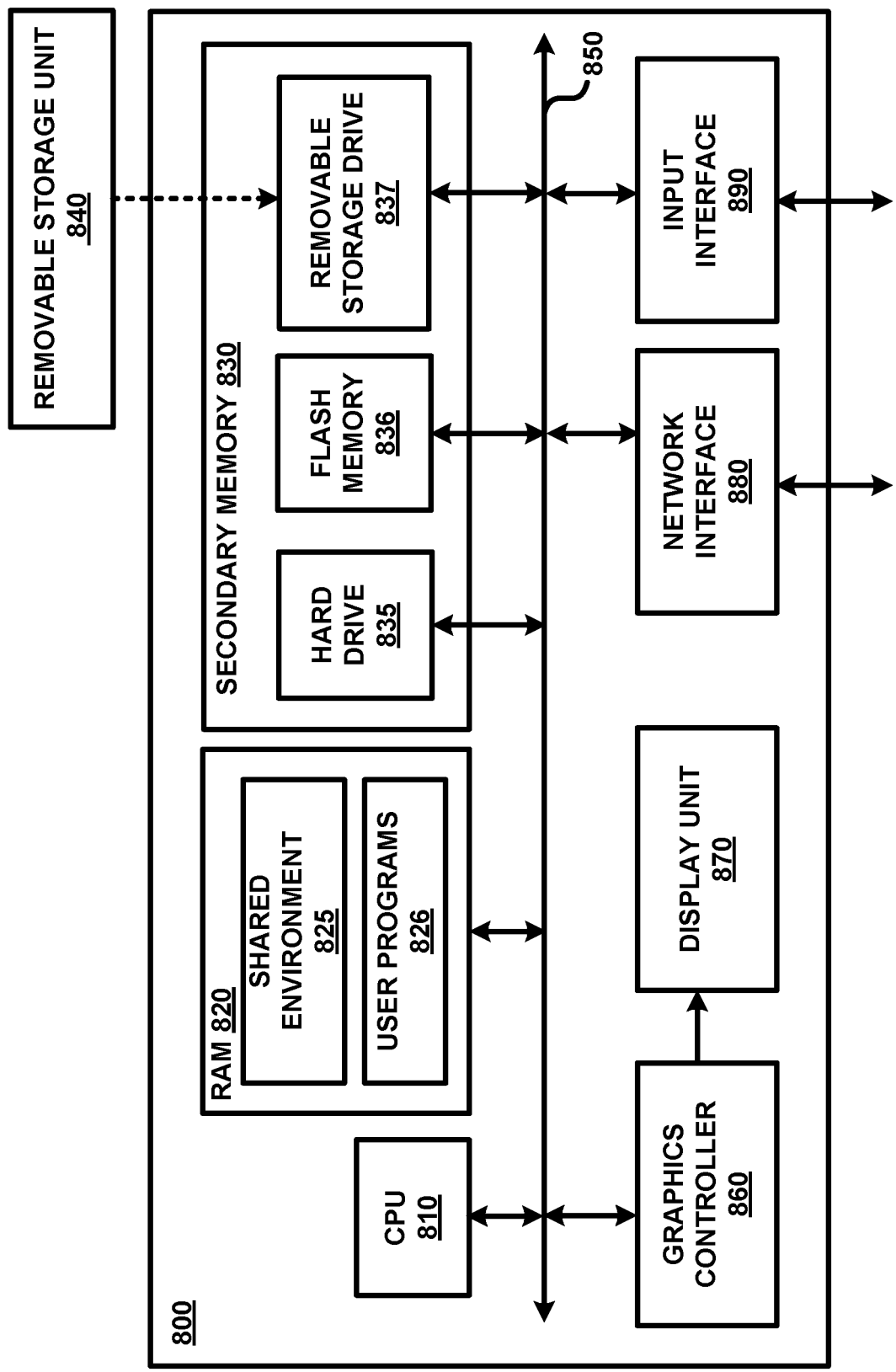
FIG. 8 is a block diagram illustrating the details of a digital processing system in which various aspects of the present disclosure are operative by execution of appropriate executable modules.

FIG. 8 is a block diagram illustrating the details of digital processing system 800 in which various aspects of the present disclosure are operative by execution of appropriate executable modules. Digital processing system 800 may correspond to each of content management system (CMS) 150 and end user systems 160A-160X.

Digital processing system 800 may contain one or more processors such as a central processing unit (CPU) 810, random access memory (RAM) 820, secondary memory 830, graphics controller 860, display unit 870, network interface 880, and input interface 890. All the components except display unit 870 may communicate with each other over communication path 850, which may contain several buses as is well known in the relevant arts. The components of FIG. 8 are described below in further detail.

CPU 810 may execute instructions stored in RAM 820 to provide several features of the present disclosure. CPU 810 may contain multiple processing units, with each processing unit potentially being designed for a specific task. Alternatively, CPU 810 may contain only a single general-purpose processing unit.

RAM 820 may receive instructions from secondary memory 830 using communication path 850. RAM 820 is shown currently containing software instructions constituting shared environment 825 and/or other user programs 826 (such as other applications, DBMS, etc.). In addition to shared environment 825, RAM 820 may contain other software programs such as device drivers, virtual machines, etc., which provide a (common) run time environment for execution of other/user programs.

Graphics controller 860 generates display signals (e.g., in RGB format) to display unit 870 based on data/instructions received from CPU 810. Display unit 870 contains a display screen to display the images defined by the display signals (for example, the portions of the user interfaces shown in FIGS. 3 and 6). Input interface 890 may correspond to a keyboard and a pointing device (e.g., touch-pad, mouse) and may be used to provide inputs. Network interface 880 provides connectivity to a network (e.g., using Internet Protocol), and may be used to communicate with other systems (of FIG. 1) connected to the network (110).

Secondary memory 830 may contain hard drive 835, flash memory 836, and removable storage drive 837. Secondary memory 830 may store the data (for example, content items, data of FIGS. 4A-4C and 7, etc.) and software instructions (for example, for implementing the various features of the present disclosure as shown in FIGS. 2 and 5, etc.), which enable digital processing system 800 to provide several features in accordance with the present disclosure. The code/instructions stored in secondary memory 830 may either be copied to RAM 820 prior to execution by CPU 810 for higher execution speeds, or may be directly executed by CPU 810.

Some or all of the data and instructions may be provided on removable storage unit 840, and the data and instructions may be read and provided by removable storage drive 837 to CPU 810. Removable storage unit 840 may be implemented using medium and storage format compatible with removable storage drive 837 such that removable storage drive 837 can read the data and instructions. Thus, removable storage unit 840 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 840 or hard disk installed in hard drive 835. These computer program products are means for providing software to digital processing system 800. CPU 810 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 830. Volatile media includes dynamic memory, such as RAM 820. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 850. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

9. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

What is claimed is:

1. A content management system (CMS) comprising:
a memory to store instructions;
one or more processors to execute the instructions stored in the memory to cause the content management system to perform operations of:
maintaining a plurality of content items in a repository of the CMS, each content item of the plurality of content items being made available based on a corresponding unique identifier, and each content item being stored in one or more versions,
wherein the CMS requires each content item to be checked-in for storing in the repository and to be checked-out from the repository for exclusive update access by end user systems;
receiving from an end user system, a create request indicating a plurality of portions of two or more content items of the plurality of content items;
generating a new content item incorporating the plurality of portions of the two or more content items indicated in the create request, wherein each of the plurality of content items and the new content item is a document comprising at least textual content, and the plurality of portions are portions of the textual content; and
checking-in the new content item into the repository of the CMS, wherein
both of the generating and the checking-in are performed without any manual intervention between receipt of the create request and completing of the checking-in, in response to the receiving of the create request, and
upon the checking-in, the new content item is made available by the CMS based on a new unique identifier along with the two or more content items in the plurality of content items.

2. The content management system of claim 1, wherein the plurality of portions are not downloaded to the end user system before the create request is received.

3. The content management system of claim 2, wherein the operations further comprise sending the new content item to the end user system as a response to the create request.

4. The content management system of claim 1, wherein the operations further comprise:
storing a link data indicating that a first portion of the plurality of portions incorporated into the new content item is linked to a second portion of a second content item of the plurality of content items;
determining that the second portion of the second content item has been modified to form a third portion after the checking-in;
identifying, based on the link data and in response to the determining, that the first portion is linked to the second portion;
replacing the first portion in the new content item with the third portion.

5. The content management system of claim 4, wherein a link indication is received associated with the create request, wherein the link indication indicates whether or not the first portion is to be linked to the second portion, wherein the content management system performs the storing, the determining, the identifying and the replacing only if the link indication indicates that the first portion is to be linked, wherein if the link indication indicates that the first portion is not to be linked, the first portion is left unchanged even if the second portion is modified after the checking-in.

6. The content management system of claim 1, wherein the operations further comprise:
receiving an update request specifying a modified portion of a content item of the plurality of content items, the modified portion corresponding to a previous portion of the content item;
generating a revised content item by incorporating the modified portion in place of the previous portion in the content item; and
checking-in the revised content item as a revised version of the content item into the plurality of content items.

7. The content management system of claim 6, wherein the update request is received from a user using the end user system, and wherein the content item is not checked-out by the user before the update request is received.

8. The content management system of claim 7, wherein the operations further comprise sending the revised content item as a response to the update request.

9. A non-transitory machine readable medium storing one or more instructions, wherein execution of the one or more instructions by one or more processors contained in a content management system (CMS) causes the content management system to perform operations of:
maintaining a plurality of content items in a repository of the CMS, each content item of the plurality of content items being made available based on a corresponding unique identifier, and each content item being stored in one or more versions,
wherein the CMS requires each content item to be checked-in for storing in the repository and to be checked-out from the repository for exclusive update access by end user systems;
receiving from an end user system, a create request indicating a plurality of portions of two or more content items of the plurality of content items;
generating a new content item incorporating the plurality of portions of the two or more content items indicated in the create request, wherein each of the textual content, and the plurality of portions are portions of the textual content; and
checking-in the new content item into the repository of the CMS, wherein
both of the generating and the checking-in are performed without any manual intervention between receipt of the create request and completing of the checking-in, in response to the receiving of the create request, and
upon the checking-in, the new content item is made available by the CMS based on a new unique identifier along with the two or more content items in the plurality of content items.

10. The non-transitory machine readable medium of claim 9, wherein the plurality of portions are not downloaded to the end user system before the create request is received.

11. The non-transitory machine readable medium of claim 10, further comprising one or more instructions for sending the new content item to the end user system as a response to the create request.

12. The non-transitory machine readable medium of claim 9, further comprising one or more instructions for:
storing a link data indicating that a first portion of the plurality of portions incorporated into the new content item is linked to a second portion of a second content item of the plurality of content items;
determining that the second portion of the second content item has been modified to form a third portion after the checking-in;
identifying, based on the link data and in response to the determining, that the first portion is linked to the second portion;
replacing the first portion in the new content item with the third portion.

13. The non-transitory machine readable medium of claim 12, wherein a link indication is received associated with the create request, wherein the link indication indicates whether or not the first portion is to be linked to the second portion, wherein the content management system perform the storing, the determining, the identifying and the replacing only if the link indication indicates that the first portion is to be linked, wherein if the link indication indicates that the first portion is not to be linked, the first portion is left unchanged even if the second portion is modified after the checking-in.

14. The non-transitory machine readable medium of claim 13, wherein the first portion, the second portion and the third portion are corresponding pages of the documents.

15. A method for updating content items, the method comprising:
maintaining a plurality of content items in a repository of the CMS, each content item of the plurality of content items being made available based on a corresponding unique identifier, and each content item being stored in one or more versions,
wherein the CMS requires each content item to be checked-in for storing in the repository and to be checked-out from the repository for exclusive update access by end user systems;
receiving from an end user system, a create request indicating a plurality of portions of two or more content items of the plurality of content items;

generating a new content item incorporating the plurality of portions of the two or more content items indicated in the create request, wherein each of the plurality of content items and the new content item is a document comprising at least textual content, and the plurality of portions are portions of the textual content; and checking-in the new content item into the repository of the CMS, wherein both of the generating and the checking-in are performed without any manual intervention between receipt of the create request and completing of the checking-in, in response to the receiving of the create request, and upon the checking-in, the new content item is made available by the CMS based on a new unique identifier along with the two or more content items in the plurality of content items.

16. The method of claim 15, wherein the plurality of portions are not downloaded to the end user system before the create request is received.

17. The method of claim 16, further comprising sending the new content item to the end user system as a response to the create request.

* * * * *

UNITED STATES PATENT AND TRADEMARK OFFICE
CERTIFICATE OF CORRECTION

PATENT NO. : 11,243,935 B2
APPLICATION NO. : 16/021056
DATED : February 8, 2022
INVENTOR(S) : Prasad et al.

It is certified that error appears in the above-identified patent and that said Letters Patent is hereby corrected as shown below:

In the Claims

In Column 14, Line 6, in Claim 9, before "textual" insert -- plurality of content items and the new content item is a document comprising at least --, therefor.

Signed and Sealed this
Thirty-first Day of May, 2022

Katherine Kelly Vidal
Director of the United States Patent and Trademark Office